UNITED STATES PATENT OFFICE.

WILLIAM D. RICHARDSON, OF CHICAGO, ILLINOIS, ASSIGNOR TO SWIFT & COMPANY, OF CHICAGO, ILLINOIS, A CORPORATION OF ILLINOIS.

PROCESS OF HYDROGENATING OILS OR FATS.

1,151,045. Specification of Letters Patent. Patented Aug. 24, 1915.

No Drawing. Application filed November 11, 1912. Serial No. 730,747.

*To all whom it may concern:*

Be it known that I, WILLIAM D. RICHARDSON, a citizen of the United States of America, and a resident of Chicago, county of Cook, and State of Illinois, have invented certain new and useful Improvements in Processes of Hydrogenating Oils or Fats, of which the following is a specification.

The object of this invention is to provide an improved method of hydrogenating oils or fats to harden or solidify them, wherein such oils or fats are treated by hydrogen in the presence of highly reactive electrically disintegrated catalytic metal to produce an absorption of such hydrogen. This object is accomplished by the following described process:

I first put in a suitable container a quantity of a liquid which is a fat solvent, which may be ether or other suitable oil or fat solvent. Two pieces of a suitable metal are then submerged in this material and connected with a suitable device for supplying an electric current through said pieces. These pieces serve as electrodes, being suitably spaced apart and provided with sufficient current to produce an electric arc across the gap between them, and to cause part of the metal of said electrodes to disintegrate and become diffused in finely divided form or in colloidal solution or suspension in the said fat solvent forming what is usually termed an organosol. The electrodes suitable for this purpose may be nickel, copper, platinum, palladium, iron, or their alloys, or other metals or alloys. These electrodes may be conveniently used in the form of rods and the electric current may be operated by a hand feed or automatic arc lamp mechanism in which the rods are clamped. The rods may be entirely or partly submerged in the fat solvent. The electric current is operated preferably at a voltage of from 40 to 150 and is preferably a direct current. The arc is allowed to continue until the desired amount of disintegrated or finely divided metal has been produced in the fat solvent. The metal and fat solvent are then separated, as may be done by settling, straining or filtering, or heating the mass until the fat solvent or the greater part thereof, has evaporated. The remaining disintegrated metal is a highly active catalyst, well adapted for hydrogenating oils. This preparation is then mixed with the mass of oil to be hydrogenated, in the proportion of about 1 to 3 per cent. of the metal to the mixture, by weight. More or less may be used if desired. The mixing is done while hydrogen gas or gas containing hydrogen is introduced into the mixture, and the hydrogenating treatment is preferably done under heat and pressure.

When operating under about 40 pounds pressure and with a temperature of about 160 degrees C., the process of hardening or solidifying of the oil or fat may be completed in from one to eight hours, depending upon the percentage of the finely divided metal used, the kind of fat or oil being hardened, the rapidity of agitation, etc., and upon the degree of hardness desired.

After the hydrogenation of the oil or fat has been accomplished the finely divided metal may be removed from the mass, as by straining, or in some cases it may be permitted to remain in the oil or fat.

Cross reference is hereby made to my copending applications, Serial Nos. 730,745; 730,746; 730,748 and 730,749 in which are described and claimed certain features of invention relating to catalyzers and fat hydrogenating processes more or less disclosed but not fully claimed herein.

I claim:—

1. The process of hydrogenating oil or fat which comprises admixing such oil or fat with electrically disintegrated catalytic metal produced in an organic liquid and treating the admixture with hydrogen to produce an absorption of such hydrogen.

2. The process of hydrogenating oil or fat which comprises admixing such oil or fat with electrically disintegrated catalytic metal produced in an organic liquid, treating the admixture with hydrogen to produce an absorption of such hydrogen and then removing the disintegrated metal from the oil or fat so treated.

3. The process of hydrogenating oil or fat which comprises admixing such oil or fat with electrically disintegrated catalytic nickel produced in an organic liquid, and treating the admixture with hydrogen to produce an absorption of such hydrogen.

4. The process of hydrogenating oil or fat which comprises admixing such oil or fat with electrically disintegrated catalytic nickel produced in an organic liquid, treating the admixture with hydrogen to produce an absorption of such hydrogen and then removing the disintegrated nickel from the oil or fat so treated.

Signed at Chicago this 25 day of October, 1912.

WILLIAM D. RICHARDSON.

Witnesses:
I. O. BEATTY,
ARTHUR CORBISHLEY.